Figure 1:
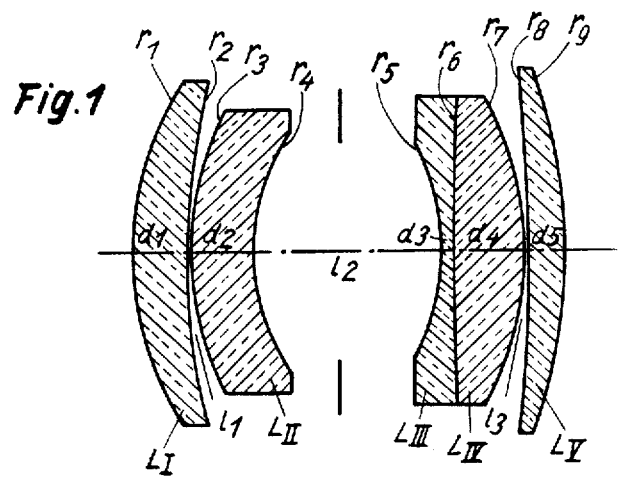

June 5, 1956  J. BERGER ET AL  2,748,656
FOUR COMPONENT GAUSS TYPE PHOTOGRAPHIC OBJECTIVE
Filed Jan. 24, 1955

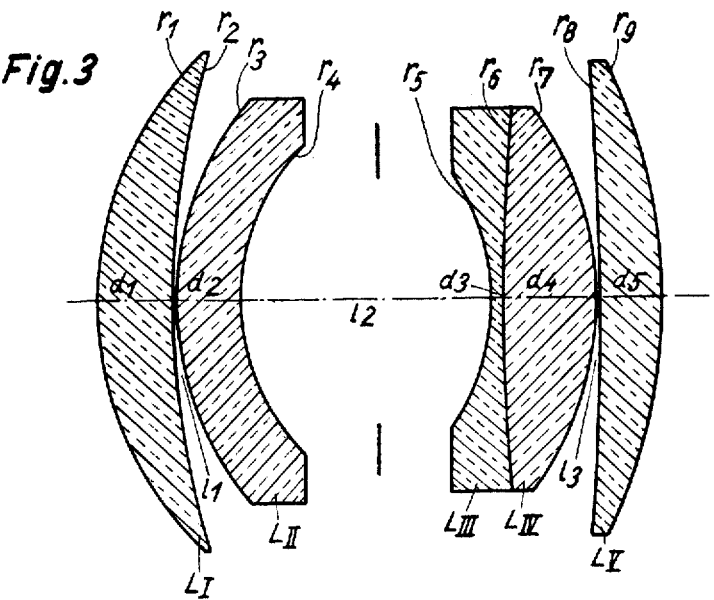
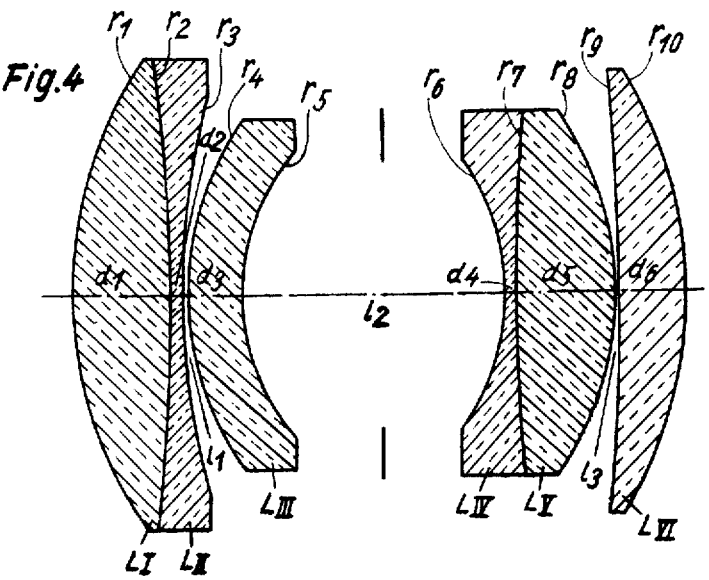

United States Patent Office 2,748,656
Patented June 5, 1956

2,748,656

FOUR COMPONENT GAUSS TYPE PHOTOGRAPHIC OBJECTIVE

Johannes Berger, Heidenheim (Brenz), and Günther Lange, Konigsbronn, Germany, assignors to Carl Zeiss, Heidenheim (Brenz), Germany Application January 24, 1955, Serial No. 483,682

Claims priority, application Germany February 12, 1954

7 Claims. (Cl. 88—57)

The invention concerns photographic objectives, which contain at least four components, of which at least two outer are collective meniscus components and at least two inner are dispersive meniscus components, all components turning their concave sides towards the diaphragm, enclosed by said two dispersive components. Such objectives are frequently called Gauss objectives. The invention includes also objectives with more than four components, whereby however the basic construction of these so-called Gauss objectives is retained i. e. that at least always one collective and always one dispersive component is arranged at both sides of the diaphragm, whereby the dispersive component in each case is that adjacent to the diaphragm.

The invention furthermore refers to objectives, in which the radii of curvature of the mentioned concave surfaces of said dispersive components in amount lie within the limits of $0.1 \cdot f$ and $0.4 \cdot f$ and the two convex surfaces of said dispersive meniscus components show the strongest collective power of all surfaces of the objective, and whereby further the vertex distance between these two last-named collective surfaces is greater than the arithmetic mean of the absolute amounts of their radii.

The investigations lying at the basis of the invention have shown, that one can attain a good comprise on the one hand between the aberrations of the central pencil determinative for the image excellence and on the other hand of the peripheral pencils, if one makes the radius of the dispersive surface bordering on air of said object side collective meniscus component smaller than the absolute amount of the radius of the dispersive surface bordering on air of said image side collective meniscus component, whereby this absolute amount for its part shall be smaller than the fourfold amount of the focal length. Furthermore it is essential for the compromise between central correction and peripheral correction, that one simultaneously also selects the axial thickness of said object side dispersive meniscus component smaller than 85% but greater than 35% of the axial thickness of said image side dispersive meniscus component, and that one selects the sum of said two axial thicknesses greater than $0.1 \cdot f$, but smaller than $0.30 \cdot f$, and that finally one selects the vertex distance between the two concave surfaces adjacent to the diaphragm greater than 0.75 times but smaller than 1.60 times of the arithmetic mean of the absolute amounts of the radii of said last-named two surfaces.

With a view to a good correction of the oblique pencils for angles outside of the range of about ±20°, it is further recommended in accordance with the invention, to make this last mentioned vertex distance even greater than the mentioned arithmetic mean itself.

In the interest of an especially well balanced coma correction it is advisable, with objectives of the mentioned kind, which are to consist of only four components, to construct the collective front component of two cemented together lenses of opposite refractive power, whereby the cemented surface is to have collective action and turn the convex side towards the diaphragm.

Finally an appropriate choice of the degree of bending of the collective outer components contributes to a good coma correction. This bending in objectives of the mentioned kind shall be so chosen, that the sum of the absolute amounts of the radii of the two outer surfaces lies within the limits of $0.5 \cdot f$ and $1.0 \cdot f$.

Through the combination in accordance with the invention of these distinguishing characteristics it is possible, to construct rapid objectives with relatively good central correction and at the same time good marginal correction.

Figure 2:
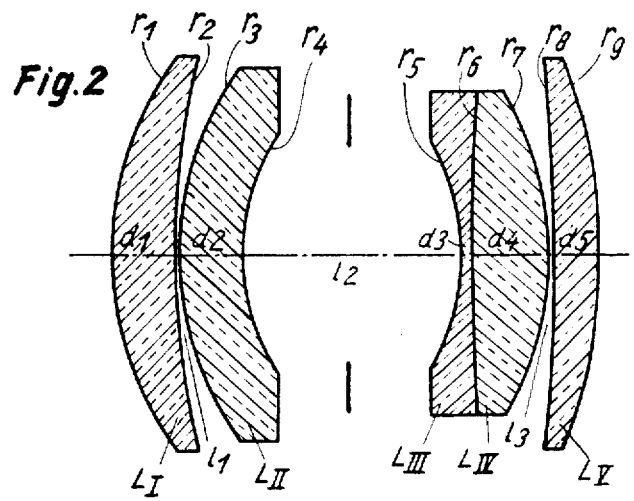

In the annexed illustrations four examples of the objectives in accordance with the present invention are represented, while in the tables adduced in the following numerical values for these examples are specified. Fig. 1 corresponds to Example I, Fig. 2 to Example II, Fig. 3 to Example III, and Fig. 4 to Example IV, whereby the latter differs in construction from the others through the cementing of the front component.

In the figures and in the examples there are designated with L the lenses
with $r$ the radii
with $d$ the thicknesses
with $l$ the air distances between the individual elements.

The values are referred to a focal length $f=1$. Examples I and II have a relative aperture of 1:3.5 and an image angle of ±28°, while for Example III the corresponding values are 1:2.8 and ±28°, and for Example IV 1:2.8 and ±26°.

*Example I*

| Lenses | Radii | Thicknesses and Distances | $n_d$ | V |
|---|---|---|---|---|
| L<sub>I</sub> | $r_1=+0.305482$ | $d_1=0.05342$ | 1.62041 | 60.3 |
| | $r_2=+0.772866$ | $l_1=0.00134$ | | |
| L<sub>II</sub> | $r_3=+0.296815$ | $d_2=0.06009$ | 1.78472 | 25.7 |
| | $r_4=+0.205635$ | $l_2=0.18428$ | | |
| L<sub>III</sub> | $r_5=-0.222581$ | $d_3=0.01335$ | 1.75520 | 27.5 |
| | $r_6=+4.73807$ | | | |
| L<sub>IV</sub> | $r_7=-0.309902$ | $d_4=0.06677$ | 1.74400 | 44.7 |
| | | $l_3=0.00134$ | | |
| L<sub>V</sub> | $r_8=-1.80664$ | $d_5=0.03606$ | 1.78472 | 25.7 |
| | $r_9=-0.516539$ | | | |

Distance between vertex of the back lens and image plane (back focus) $s'=0.7599 \cdot f$.

*Example II*

| Lenses | Radii | Thicknesses and Distances | $n_d$ | V |
|---|---|---|---|---|
| L<sub>I</sub> | $r_1=+0.324688$ | $d_1=0.06411$ | 1.62041 | 60.3 |
| | $r_2=+0.815591$ | $l_1=0.00150$ | | |
| L<sub>II</sub> | $r_3=+0.306524$ | $d_2=0.06164$ | 1.76182 | 26.5 |
| | $r_4=+0.213899$ | $l_2=0.21134$ | | |
| L<sub>III</sub> | $r_5=-0.221740$ | $d_3=0.01122$ | 1.75520 | 27.5 |
| | $r_6=+2.54223$ | | | |
| L<sub>IV</sub> | $r_7=-0.310967$ | $d_4=0.07481$ | 1.74400 | 44.7 |
| | | $l_3=0.00150$ | | |
| L<sub>V</sub> | $r_8=-2.10848$ | $d_5=0.04489$ | 1.76182 | 26.5 |
| | $r_9=-0.514596$ | | | |

Distance between vertex of the back lens and image plane (back focus) $s'=0.7441 \cdot f$.

Example III

| Lenses | Radii | Thicknesses and Distances | $n_d$ | V |
|---|---|---|---|---|
| $L_I$ | $r_1=+0.331773$ | $d_1=0.07397$ | 1.62041 | 60.3 |
|  | $r_2=+0.833365$ | $l_1=0.00133$ |  |  |
| $L_{II}$ | $r_3=+0.302147$ | $d_2=0.06279$ | 1.76182 | 26.5 |
|  | $r_4=+0.210846$ | $l_2=0.24079$ |  |  |
| $L_{III}$ | $r_5=-0.220145$ | $d_3=0.01330$ | 1.71736 | 29.5 |
| $L_{IV}$ | $r_6=+2.04859$ | $d_4=0.09046$ | 1.69067 | 54.9 |
|  | $r_7=-0.315477$ | $l_3=0.00133$ |  |  |
| $L_V$ | $r_8=-2.93566$ | $d_5=0.06066$ | 1.75520 | 27.5 |
|  | $r_9=-0.525817$ |  |  |  |

Distance between vertex of the back lens and image plane (back focus) $s'=0.7229 \cdot f$.

Example IV

| Lenses | Radii | Thicknesses and Distances | $n_d$ | V |
|---|---|---|---|---|
| $L_I$ | $r_1=+0.405925$ | $d_1=0.09287$ | 1.66672 | 48.4 |
|  | $r_2=-1.74900$ |  |  |  |
| $L_{II}$ | $r_3=+0.748300$ | $d_2=0.01238$ | 1.60323 | 42.5 |
|  | $r_4=+0.293649$ | $l_1=0.00495$ |  |  |
| $L_{III}$ |  | $d_3=0.05275$ | 1.75520 | 27.5 |
|  | $r_5=+0.210894$ | $l_2=0.25385$ |  |  |
| $L_{IV}$ | $r_6=-0.231573$ | $d_4=0.01238$ | 1.69895 | 30.1 |
|  | $r_7=+2.20206$ |  |  |  |
| $L_V$ | $r_8=-0.311047$ | $d_5=0.09535$ | 1.60562 | 43.9 |
|  | $r_9=-2.26632$ | $l_3=0.00124$ |  |  |
| $L_{VI}$ | $r_{10}=-0.433081$ | $d_6=0.06439$ | 1.74400 | 44.7 |

Distance between vertex of the back lens and image plane (back focus) $s'=0.8200 \cdot f$.

Example IV is distinguished by a relatively great back focus and therefore is specially suitable for installation in mirror reflex cameras.

Each of the above mentioned examples shows four components, of which in Examples I, II, and III only the third component is cemented, in Example IV on the other hand the first and the third elements. The characteristics of the invention, as stated in the following claims 1, 2 and 4, to be sure can also be applied to such Gauss objectives, in which other elements are cemented or supplementary elements are provided, i. e. hence contain more than only four elements. However, it is essential, that the basic construction of the so-called Gauss objectives is retained, that each a collective and a dispersive element stands at both sides of the diaphragm, whereby the dispersive element in each case is adjacent to the diaphragm and its dispersive concave surface is turned towards the diaphragm.

Also, the cemented elements can be broken up by small air spaces. Through such measures for example, as is familiar, the coma corrections can be still further improved to a certain extent. Determinative for the introduction of such measures is solely the question, whether the thereby occasioned higher costs are worth the expenditure. In the above cited examples of objectives in accordance with the invention solely the basic construction was employed.

We claim:

1. Photographic objective, containing four components the two outer being collective meniscus components, and the two inner being dispersive meniscus components, all components turning their concave sides towards the diaphragm enclosed by said two dispersive components, the radii of curvature of the concave surfaces of said dispersive components in absolute amount lying within the limits of 0.1·f and 0.4·f, f being the focal length of the objective, and the two concave surfaces of said dispersive meniscus components showing the strongest collective power of all surfaces of the objective, the vertex distance between said two last named collective surfaces being greater than the arithmetic mean of the absolute amounts of their radii, the radius of the dispersive surface bordering on air of said object side collective meniscus component being smaller than the absolute amount of the radius of the dispersive surface bordering on air of said image side collective meniscus component, said absolute amount for its part being smaller than the fourfold amount of the focal length, the axial thickess of said object side dispersive meniscus component being smaller than 85% but greater than 35% of the axial thickness of said image side dispersive meniscus component, and the sum of said two axial thicknesses being greater than 0.10·f but smaller than 0.30·f, and the vertex distance between the two concave surfaces adjacent to the diaphragm being greater than 0.75 times but smaller than 1.60 times the arithmetic mean of the absolute amounts of the radii of said last-named two surfaces.

2. Photographic objective according to claim 1, consisting of four meniscus components, the collective front component being composed of two cemented together lenses of opposite refractive power, the cement surface possessing collective action and turning the convex side towards the diaphragm.

3. Photographic objective according to claim 1, the sum of the absolute amounts of the radii of the two outermost surfaces of the objective being within the limits of 0.5·f and 1.0·f.

4. Photographic objective according to claim 1, the surface refractive powers ($\Delta n/r$) each deviating at most by ±0.5/f and the lens thicknesses ($d$) and the air distances ($l$) each by at most ±0.05·f from the values to be taken from the following numerical example, whereby f signifies the focal length of the objective:

| Lenses | Radii | Thicknesses and Distances | $n_d$ | V | $\Delta n/r$ |
|---|---|---|---|---|---|
| $L_I$ | $r_1=+0.305482 \cdot f$ | $d_1=0.05342 \cdot f$ | 1.62041 | 60.3 | $+2.030921/f$ |
|  | $r_2=+0.772866 \cdot f$ | $l_1=0.00134 \cdot f$ |  |  | $-0.802739/f$ |
| $L_{II}$ | $r_3=+0.296815 \cdot f$ | $d_2=0.06009 \cdot f$ | 1.78472 | 25.7 | $+2.643801/f$ |
|  | $r_4=+0.205635 \cdot f$ | $l_2=0.18428 \cdot f$ |  |  | $-3.816081/f$ |
| $L_{III}$ | $r_5=-0.222581 \cdot f$ | $d_3=0.01335 \cdot f$ | 1.75520 | 27.5 | $-3.392922/f$ |
| $L_{IV}$ | $r_6=+4.73807 \cdot f$ | $d_4=0.06677 \cdot f$ | 1.74400 | 44.7 | $-0.002363/f$ |
|  | $r_7=-0.309902 \cdot f$ | $l_3=0.00134 \cdot f$ |  |  | $+2.400758/f$ |
| $L_V$ | $r_8=-1.80664 \cdot f$ | $d_5=0.03606 \cdot f$ | 1.78472 | 25.7 | $-0.434353/f$ |
|  | $r_9=-0.516539 \cdot f$ |  |  |  | $+1.519188/f$ |

5. Photographic objective according to claim 1, the surface refractive powers ($\Delta n/r$) each deviating at most by $\pm 0.5/f$ and the lens thicknesses ($d$) and the air distances ($l$) each by at most $\pm 0.05 \cdot f$ from the values to be taken from the following numerical example, whereby f signifies the focal length of the objective:

| Lenses | Radii | Thicknesses and Distances | $n_d$ | V | $\Delta n/r$ |
|---|---|---|---|---|---|
| $L_I$ | $r_1 = +0.324688 \cdot f$ | $d_1 = 0.06411 \cdot f$ | 1.62041 | 60.3 | $+1.910788/f$ |
| | $r_2 = +0.815591 \cdot f$ | | | | $-0.760687/f$ |
| | | $l_1 = 0.00150 \cdot f$ | | | |
| $L_{II}$ | $r_3 = +0.306524 \cdot f$ | $d_2 = 0.06164 \cdot f$ | 1.76182 | 26.5 | $+2.485351/f$ |
| | $r_4 = +0.213899 \cdot f$ | | | | $-3.561587/f$ |
| | | $l_2 = 0.21134 \cdot f$ | | | |
| $L_{III}$ | $r_5 = -0.221740 \cdot f$ | $d_3 = 0.01122 \cdot f$ | 1.75520 | 27.5 | $-3.405790/f$ |
| | $r_6 = +2.54223 \cdot f$ | | | | $-0.004406/f$ |
| $L_{IV}$ | $r_7 = -0.310967 \cdot f$ | $d_4 = 0.07481 \cdot f$ | 1.74400 | 44.7 | $+2.392536/f$ |
| | | $l_3 = 0.00150 \cdot f$ | | | |
| $L_V$ | $r_8 = -2.10848 \cdot f$ | $d_5 = 0.04489 \cdot f$ | 1.76182 | 26.5 | $-0.361312/f$ |
| | $r_9 = -0.514596 \cdot f$ | | | | $+1.480423/f$ |

6. Photographic objective according to claim 1, the surface refractive powers ($\Delta n/r$) each deviating at most by $\pm 0.5/f$ and the lens thicknesses ($d$) and the air distances ($l$) each by at most $\pm 0.05 \cdot f$ from the values to be taken from the following numerical example, whereby f signifies the focal length of the objective:

| Lenses | Radii | Thicknesses and Distances | $n_d$ | V | $\Delta n/r$ |
|---|---|---|---|---|---|
| $L_I$ | $r_1 = +0.331773 \cdot f$ | $d_1 = 0.07397 \cdot f$ | 1.62041 | 60.3 | $+1.869983/f$ |
| | $r_2 = +0.833365 \cdot f$ | | | | $-0.744464/f$ |
| | | $l_1 = 0.00133 \cdot f$ | | | |
| $L_{II}$ | $r_3 = +0.302147 \cdot f$ | $d_2 = 0.06279 \cdot f$ | 1.76182 | 26.5 | $+2.521356/f$ |
| | $r_4 = +0.210846 \cdot f$ | | | | $-3.613158/f$ |
| | | $l_2 = 0.24079 \cdot f$ | | | |
| $L_{III}$ | $r_5 = -0.220145 \cdot f$ | $d_3 = 0.01330 \cdot f$ | 1.71736 | 29.5 | $-3.258580/f$ |
| | $r_6 = +2.04859 \cdot f$ | | | | $-0.013028/f$ |
| $L_{IV}$ | $r_7 = -0.315477 \cdot f$ | $d_4 = 0.09046 \cdot f$ | 1.69067 | 54.9 | $+2.189288/f$ |
| | | $l_3 = 0.00133 \cdot f$ | | | |
| $L_V$ | $r_8 = -2.93566 \cdot f$ | $d_5 = 0.06066 \cdot f$ | 1.75520 | 27.5 | $-0.257250/f$ |
| | $r_9 = -0.525817 \cdot f$ | | | | $+1.436241/f$ |

7. Photographic objective according to claim 1, the surface refractive powers ($\Delta n/r$) each deviating at most by $\pm 0.5/f$ and the lens thicknesses ($d$) and the air distances ($l$) each by at most $\pm 0.05 \cdot f$ from the values to be taken from the following numerical example, whereby f signifies the focal length of the objective:

| Lenses | Radii | Thicknesses and Distances | $n_d$ | V | $\Delta n/r$ |
|---|---|---|---|---|---|
| $L_I$ | $r_1 = +0.405925 \cdot f$ | $d_1 = 0.09287 \cdot f$ | 1.66672 | 48.4 | $+1.642470/f$ |
| | $r_2 = -1.74909 \cdot f$ | | | | $+0.036298/f$ |
| $L_{II}$ | | $d_2 = 0.01238 \cdot f$ | 1.60323 | 42.5 | $-0.806133/f$ |
| | $r_3 = +0.748300 \cdot f$ | | | | |
| | | $l_1 = 0.00495 \cdot f$ | | | |
| | $r_4 = +0.293649 \cdot f$ | | | | $+2.571777/f$ |
| $L_{III}$ | | $d_3 = 0.05275 \cdot f$ | 1.75520 | 27.5 | |
| | $r_5 = +0.210894 \cdot f$ | | | | $-3.580945/f$ |
| | | $l_2 = 0.25385 \cdot f$ | | | |
| | $r_6 = -0.231573 \cdot f$ | | | | $-3.018270/f$ |
| $L_{IV}$ | | $d_4 = 0.01238 \cdot f$ | 1.69895 | 30.1 | |
| | $r_7 = +2.20206 \cdot f$ | | | | $-0.042383/f$ |
| $L_V$ | | $d_5 = 0.09535 \cdot f$ | 1.60562 | 43.9 | $+1.947036/f$ |
| | $r_8 = -0.311047 \cdot f$ | | | | |
| | | $l_3 = 0.00124 \cdot f$ | | | |
| | $r_9 = -2.26632 \cdot f$ | | | | $-0.328285/f$ |
| $L_{VI}$ | | $d_6 = 0.06439 \cdot f$ | 1.74400 | 44.7 | |
| | $r_{10} = -0.433081 \cdot f$ | | | | $+1.717923/f$ |

References Cited in the file of this patent

UNITED STATES PATENTS

| | | |
|---|---|---|
| 583,336 | Rudolph | May 25, 1897 |
| 2,171,640 | Berek | Sept. 5, 1939 |
| 2,487,749 | Wynne | Nov. 8, 1949 |
| 2,672,788 | Brendel | Mar. 23, 1954 |
| 2,683,398 | Klemt et al. | July 13, 1954 |

FOREIGN PATENTS

| | | |
|---|---|---|
| 665,520 | Germany | Sept. 27, 1938 |

UNITED STATES PATENT OFFICE
CERTIFICATE OF CORRECTION

Patent No. 2,748,656            June 5, 1956

Johannes Berger et al.

It is hereby certified that error appears in the printed specification of the above numbered patent requiring correction and that the said Letters Patent should read as corrected below.

Column 4, line 21, for "concave" read -- convex --.

Signed and sealed this 1st day of December 1959.

(SEAL)
Attest:

KARL H. AXLINE
Attesting Officer

ROBERT C. WATSON
Commissioner of Patents